Sept. 10, 1946.  W. A. LEBUS  2,407,339
FILM GATE RELEASE
Original Filed Nov. 9, 1942    6 Sheets-Sheet 6
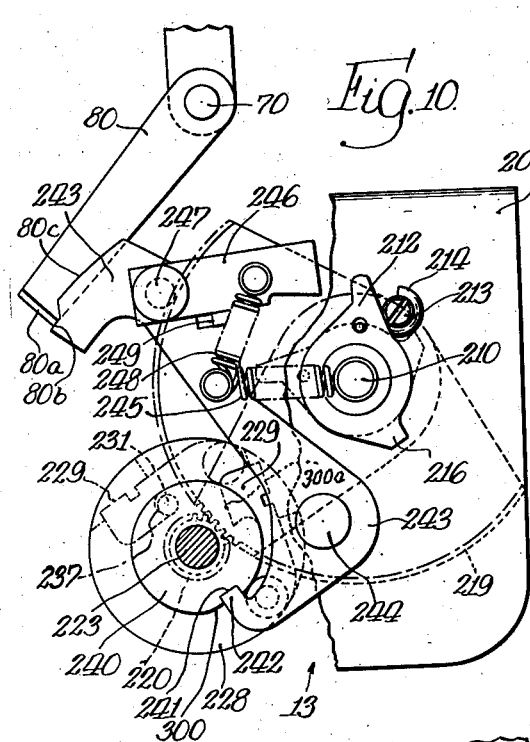
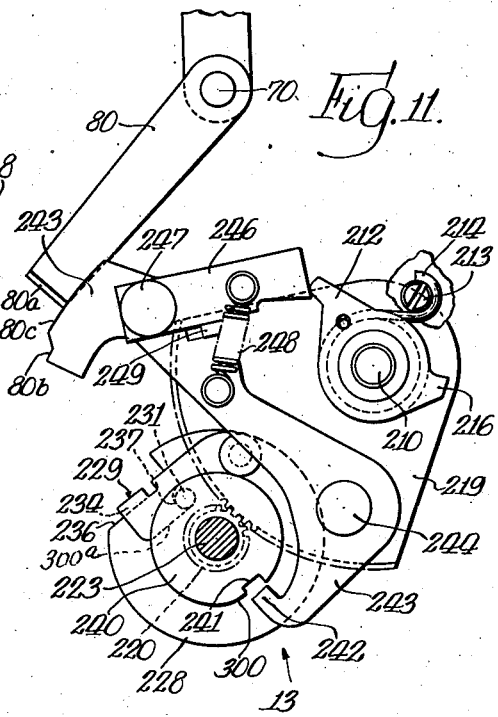
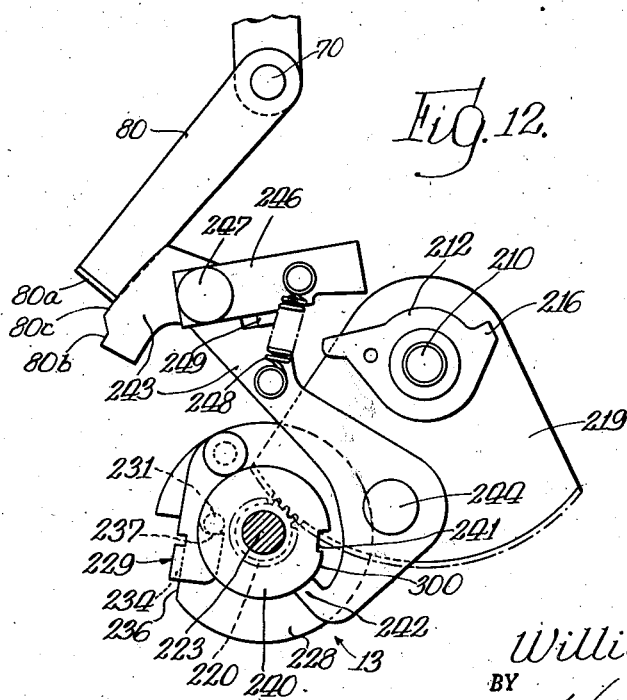
INVENTOR.
William A. Lebus,
BY
Attys.

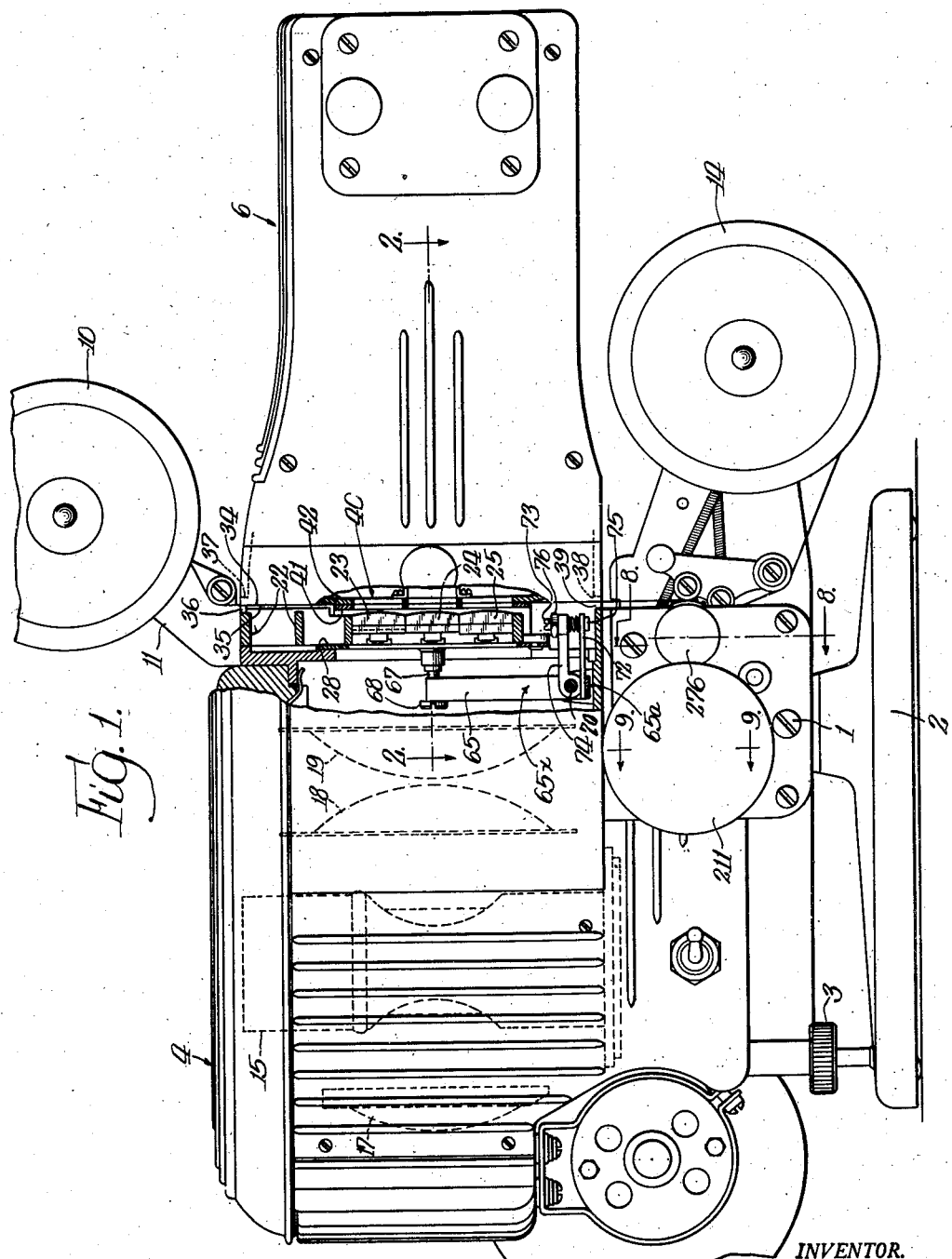

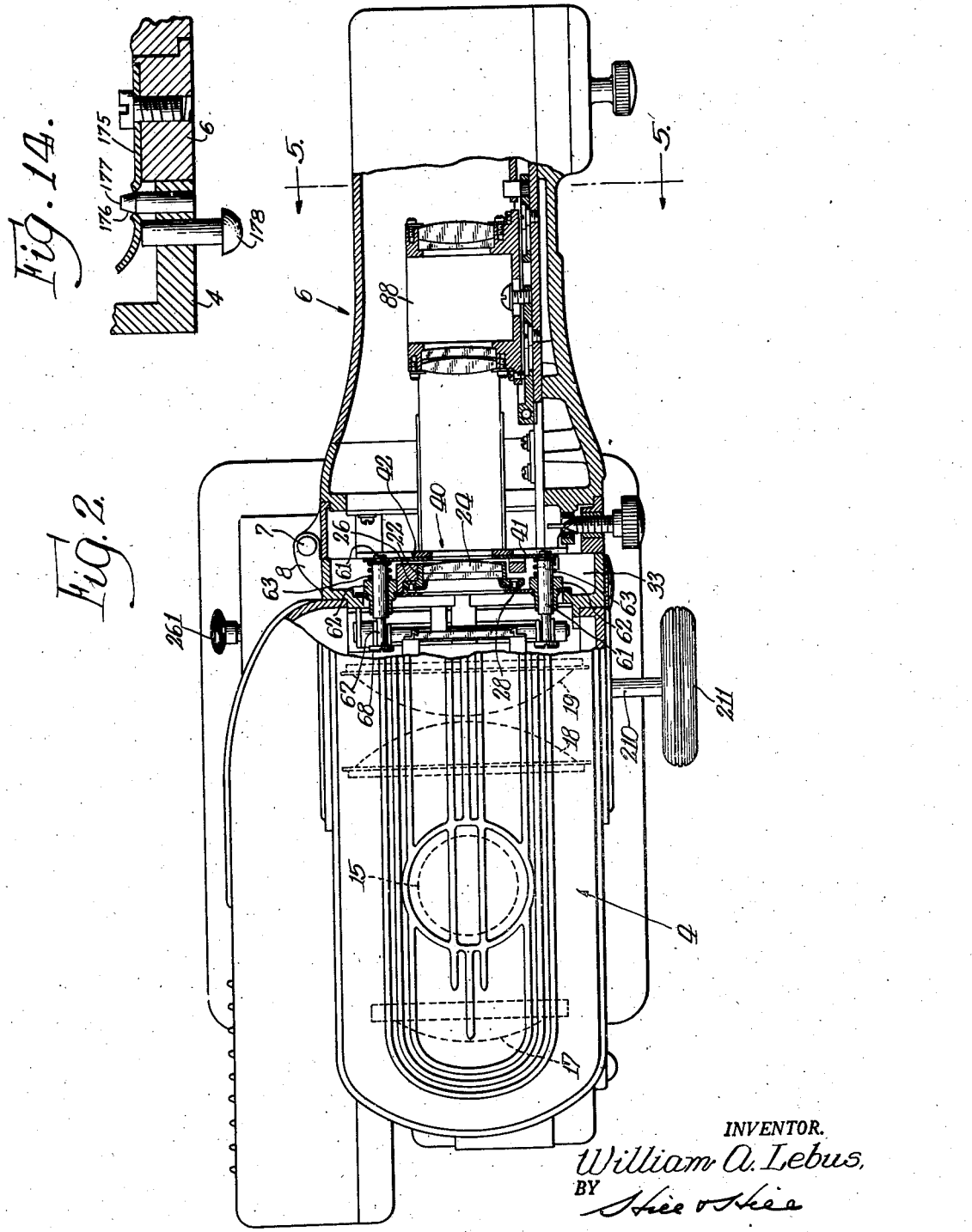

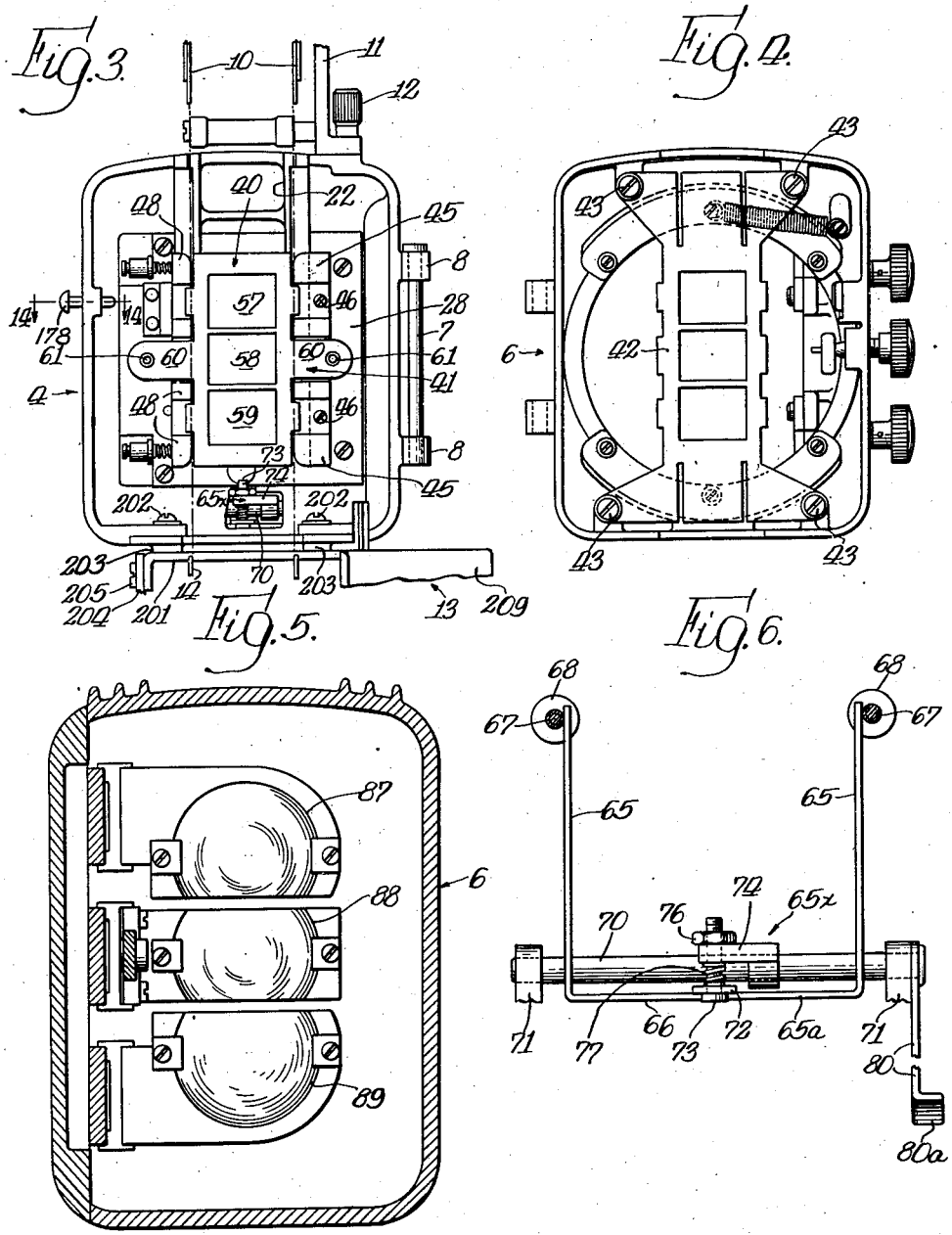

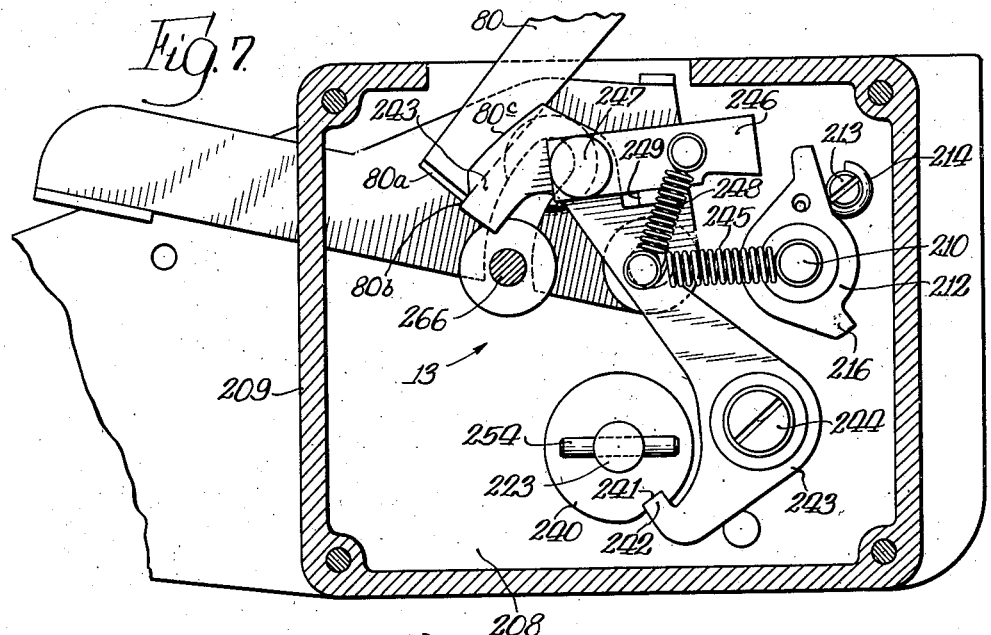
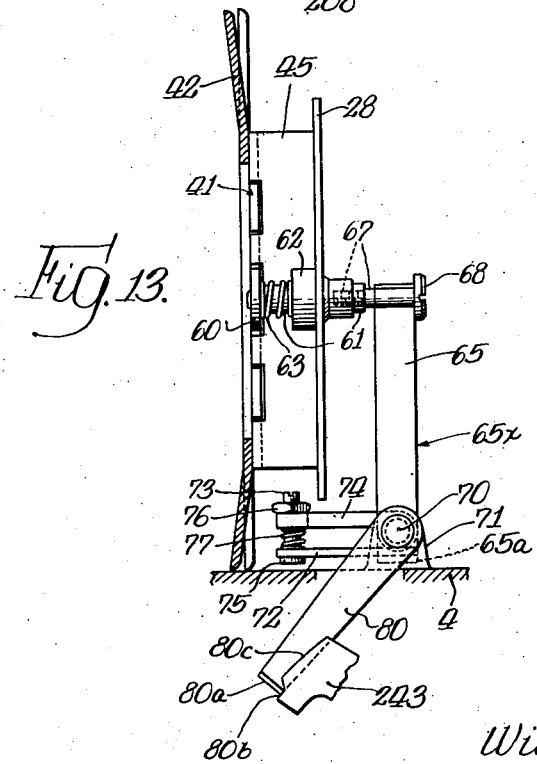

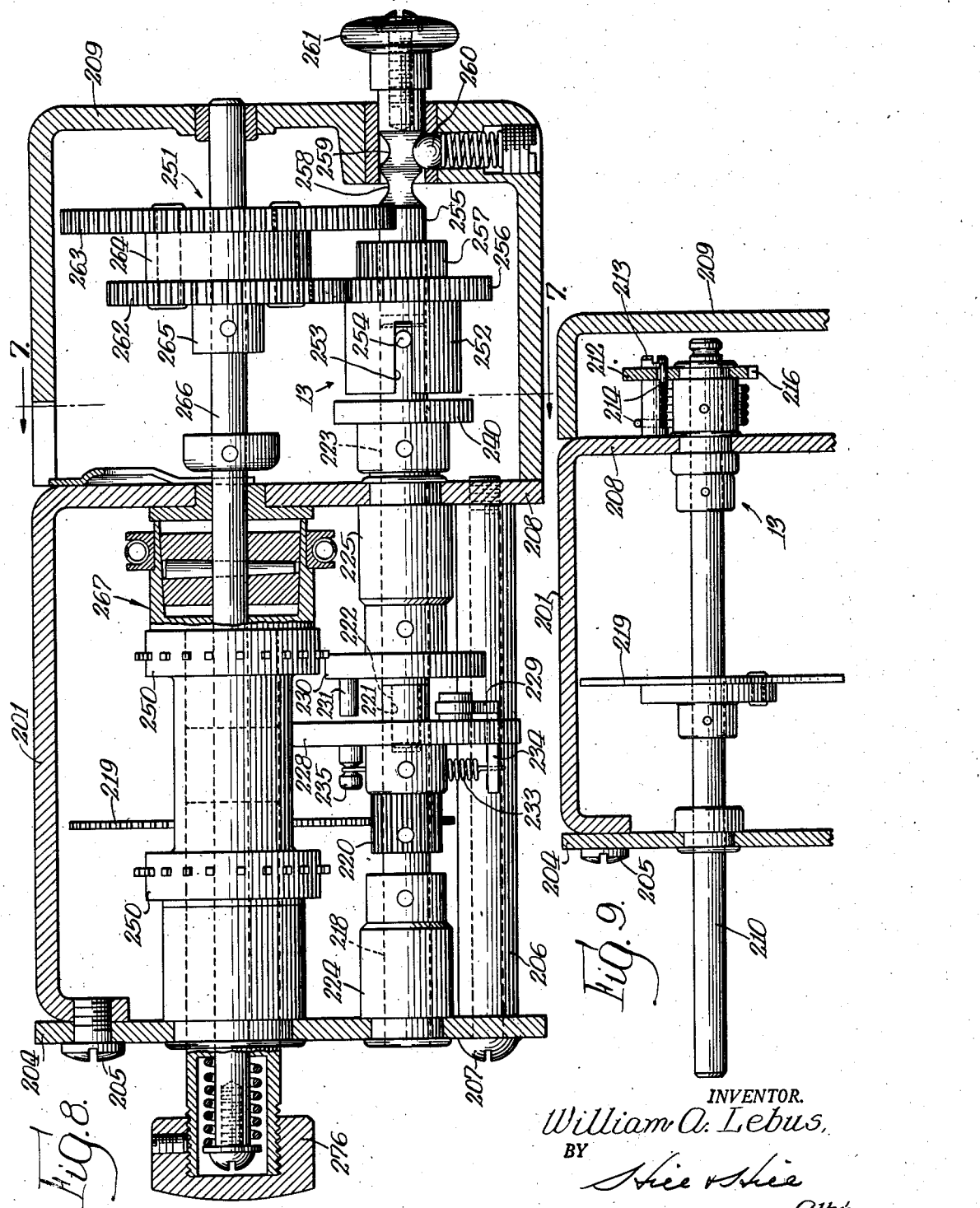

Patented Sept. 10, 1946

2,407,339

UNITED STATES PATENT OFFICE 2,407,339

FILM GATE RELEASE

William A. Lebus, Chicago, Ill., assignor to Prismacolor, Inc., Chicago, Ill., a corporation of Illinois Original application November 9, 1942, Serial No. 464,961, now Patent No. 2,384,319, dated September 4, 1945. Divided and this application March 18, 1944, Serial No. 527,100

12 Claims. (Cl. 88—28)

The present invention is directed to a new form, construction, arrangement and combination of parts all embodied in a projector adapted for multiple color picture projection, and the subject matter thereof has been divided out of my prior application for patent on an improvement in a projector filed November 9, 1942, Serial No. 464,961, now Patent No. 2,384,319, dated September 4, 1945. Reference may be had to said prior application for a fuller description of many of the details of construction embodied in the present application but which form no part of the present subject matter. This projector is of the type wherein individual images or colored cut-outs of the same photographed object are provided by a film or a plate and are projected upon a screen by an assembly of juxtaposed lenses or lens groups, and wherein the respective groups of lenses are positioned in the paths of light that are passed through the respective color filters and wherein the images are brought into focus upon a common plane comprising a picture screen so as to present a composite colored picture by the superimposed relation of the different colored images. In the device of the present invention, the photographed objects are provided on a film in triplicate and in black and white by any suitable camera for this purpose, and the film is fed vertically through the machine. The same machine could be constructed to feed the film horizontally if that should be desired depending upon the type of film and the nature of the camera producing this film.

An object of this invention is the arrangement and combination of parts which provide a pivotally supported lens housing which carries all of the mechanisms for the precision projection on the screen of the colored images, such pivotal housing providing means for access to the mechanism which provides the film track and film threading mechanism.

All further improvements and refinements in the various mechanisms embodied in the projector of the present invention shall hereinafter be referred to in a more detailed description of the working parts thereof and as relating to the accompanying drawings illustrating a preferred embodiment of the projector of the present invention.

In the drawings:

Fig. 1 is a side elevational view of the projector embodying the new and novel features of my invention, partially broken away and in section, to illustrate the film gate and mechanism for retracting the pressure plates thereof;

Fig. 2 is a horizontal section through the film gate and lens housing taken on the line 2—2 of Fig. 1;

Fig. 3 is a front elevation of the lamp housing illustrating the pressure plate and associated parts of the film gate;

Fig. 4 is an end elevation of the lens housing as viewed from the film end thereof and illustrating the stationary plate of the film gate;

Fig. 5 is a cross section through the lens housing taken on the line 5—5 of Fig. 2;

Fig. 6 is a detail view illustrating the pressure plate retracting mechanism;

Fig. 7 is a cross sectional view as taken substantially along the line 7—7 of Fig. 8 illustrating certain of the film transport mechanism parts, and a fragment of the pressure plate retracting lever;

Fig. 8 is a vertical transverse cross sectional view through the film transport mechanism, taken substantially through the lines 8—8 in Fig. 1;

Fig. 9 is a fragmentary sectional view taken along the line 9—9 of Fig. 1;

Figs. 10 to 12 inclusive are fragmentary illustrations of certain of the working parts of the film transport mechanism showing the same in various operative relationships to illustrate certain steps in the operation of said film transport mechanism;

Fig. 13 is a detail side elevation of the pressure plate retracting lever; and

Fig. 14 is a detail horizontal section of the latching means between the lamp housing and lens housing taken substantially on the line 14—14 of Fig. 3.

Referring to the drawings, the projector is pivotally supported at 1 upon a base 2 and may be suitably tilted as by the levelling screw mechanism 3 in a known manner. The projector housing is primarily divided into a main casing or lamp housing 4 and a lens housing 6 which is pivotally supported upon the vertically disposed pin 7 carried by the lugs 8 of the main housing 4. As in the above identified application, in order to maintain the pivotal lens housing in closed and abutting relation in respect to the main housing 4, the side of the lens housing 6 opposite the hinges is provided, as shown in Fig. 14 with a latch spring 175 having a hole 176 adapted to snap over the fixed pin 177 with the latter engaging in the hole at 176 of the spring 175. This will positively hold the relatively movable housing in closed relation, and a hand operated button 178 may be provided, which when depressed engages the end of the spring 175 and moves said spring sufficiently inwardly to have the hole 176 clear the end of the pin 177 for opening the lens housing. The film may be fed through the projector housing in any desirable manner and in the present construction the film supply reel 10 is pivotally mounted on the bracket 11 secured to the main housing 4 by a knurled screw 12 and the film is passed through the projector housing substantially along the line of the opposing surfaces of the fixedly supported main housing 4 and the pivotal lens housing 6 and passes through a film gate 40 and through suitable mechanism comprising the film transport unit 13 which is adapted for moving the film through the projector and for driving the film rewind reel 14.

Referring more particularly to Fig. 1 it is to be noted that the main lamp housing 4 contains the necessary light projecting system which may be generally described as follows: The light source comprises the lamp 15, a reflector 17 disposed rearwardly with respect to the lamp with a pair of condensing lenses 18 and 19 disposed forwardly of the lamp and in the path of the reflected light.

A color filter unit comprising a removable frame 22 carrying the colored lenses 23, 24 and 25 is suitably nested in appropriate guideways such as 26 in Fig. 2 in the forward end of the main housing.

Referring more particularly to Fig. 1, it is to be noted that the film passes downwardly substantially in line with the meeting edges of the pivotal lens housing 6 and the forward face of the lamp housing 4 which are designated as 34 and 35, respectively. In order that the film may enter the projector along the aforementioned juncture line, the upper portion of the filter frame is cut away as at 36 and the upper meeting edge of the pivotal lamp housing is also recessed as at 37. Also, in order that the film may pass out of the projector, the bottom meeting edge of the lens housing 6 is recessed as at 38 for cooperation with a complementary recess 39 formed in the bottom face edge of the lamp housing 4. The film guiding and aligning gate mechanism generally is indicated by the reference numeral 40 and this mechanism is housed in the chamber 33 at the forward open end of the main housing 4 of the projector.

*Film guiding and aligning mechanism*

Referring now more particularly to Figs. 1, 2, 3 and 4, the film guiding and aligning gate mechanism comprises a resiliently supported pressure plate 41 which is adapted to normally urge the film tightly against the stationary plate 42 when the lens housing is in closed position. The latter plate is mounted to be fixedly carried by the pivotal lens housing 6 by means of suitable screws 43 and swings bodily therewith when the lens housing is opened or closed. The resilient pressure plate 41 is suitably disposed between the fixed laterally disposed guide member 45 secured to the plate 28 by means of suitable screws 46. This lateral film guide 45 provides a stationary member for constantly receiving and aligning one edge of the film as the latter passes through the projector. Oppositely disposed with respect to the fixed guide 45 is a movably mounted guide 48 that is adapted to engage the other edge of the film and by resilient means will hold the film laterally against the fixed guide 45.

The pressure plate 41 is disposed between the fixed guide 45 and the movable guide 48 with sufficient clearance to allow fore and aft movement thereof and it is to be noted as best shown in Fig. 3 that the pressure plate is provided with three apertures 57, 58 and 59 which are adapted to definitely outline each particular frame of the triplicate set of pictures of the same photographed object. The pressure plate 41 is also provided with lateral arms 60 which are adapted to fixedly receive the studs 61 slidably supported in the bearing sleeve members 62 also secured to the plate 28. Suitable springs 63 encircle the studs 61 and are confined between the fixed bearing sleeve 62 and the pressure plate 41 to maintain the latter forwardly and in engagement with the rear side of the film to hold the latter against the fixed backing plate 42 carried in the pivotal lens housing 6.

In order to permit the free movement of the film during the transposition of the pictures which are being projected, the pressure plate 41 is bodily moved rearwardly by means of a pressure plate retracting lever 65x comprising among other things the vertically disposed ends 65 of the U-shaped bracket 66 (see Fig. 6). The ends 65 of the bracket lie adjacent the reduced ends 67 of the studs 61 and are adapted for engaging the screws 68 which are threaded into the reduced bores 67 of the studs 61. The bracket 66 is pivotally supported to be rocked about a shaft 70 pivotally supported by means of lugs 71 carried by the main housing 4. The central portion 65a of the U-shaped bracket 66 lies beneath the shaft 70 and is provided with a projecting arm 72. Arm 72 is connected by means of an adjustable pin 73 to the arm 74 which is fixed to the shaft 70 to rotate directly with the latter. Obviously any motion imparted to the arm 74 by means of the shaft 70 will act to lift the arm 72 by means of the head 75 of the pin engaging the under side of the arm 72 and by means of the adjustable nut 76 bearing against the upper side of the arm 74. Also, the spring 77 is interposed to maintain the proper spaced relation between arms 72 and 74 so that suitable adjustment for moving the pressure plate 41 rearwardly by means of the ends 65 of the U-shaped bracket 66 may be conveniently accomplished.

Synchronized motion is imparted to the shaft 70 by means of an arm 80 connected with and secured to shaft 70, the arm 80 being actuated through the operation of the film transport mechanism in a manner which will hereinafter be fully explained. The foregoing mechanism provides the means and mechanism whereby the film is always maintained in a fixed focal plane with respect to the lens groups mounted in the pivotal lens housing 6 and the latter when released and opened also provides the means for properly threading the film through the projector and through the guiding and aligning mechanism as described above.

*The lenses*

Referring now more particularly to Figs. 1, 2 and 5, it will be seen that these groups of lenses 87, 88, 89 are employed, arranged one above the other in line with the pressure and backing plate apertures, and adjustably mounted for focusing them and for adjusting them through a vertical plane and through horizontal planes to register the pictures and superimpose them one upon the other on the screen. The lens mounting and lens adjustment means are substantially the same as those shown and described in my prior application above referred to, to which reference may be had for a full understanding of this construction and operation. No further description of the lenses and their mountings is thought necessary so far as this specification is concerned since they form no part of the subject matter of this application.

Film transport mechanism

The film transport mechanism 13 is supported by means of a bracket 201 fastened to the underside of the lamp housing 4 by means of the screws 202, see Fig. 3, which pass into the appropriate bosses 203. The side plate 204 is secured to one end of the bracket 201 by means of screws 205, said plate depending from the upper end of the bracket and being secured at its lower end by means of tubular spacers 206 and bolts 207, which pass through the spacers and thread into the depending side 208 of the bracket 201. Another housing 209 is secured to the side 208 of the bracket 201 for housing a portion of the film transport mechanism therein as best shown in Figs. 7 and 8.

Referring more particularly to Figs. 7, 8 and 9, which illustrate the film transport mechanism, movement is imparted to the film by means of the drive shaft 210 when the latter is rotated by the hand wheel 211. Shaft 210 is journaled in the side 208 of the bracket 201 and in the side plate 204 and projects into the housing 209. An actuating arm 212 is secured to the end of the shaft 210 within the housing 209 and the arm 212 is normally maintained against the stop 213 by means of a coil spring 214 which has one end looped about the stop 213 with the other end disposed in a hole in the actuating arm 212. The foregoing mechanism will, therefore, maintain the shaft 210 in a definite position at all times and at the same time the shaft 210 may be rotated a limited amount against the action of the spring 214 with the spring returning the shaft and the hand wheel 211 to their initial position whenever the hand wheel 211 is released. The actuating arm 212 is provided with a lug 216 adapted to strike against the stop 213 for limiting the movement of the hand wheel 211 and its associated shaft 210 when the hand wheel is turned against the action of the spring 214.

The drive from shaft 210 is transmitted to a shaft 218 through the instrumentality of a gear segment 219 secured to shaft 210 and the pinion 220 secured to shaft 218. Shaft 218 is provided with a reduced bore 221 adapted for receiving the reduced end 222 of shaft 223 which is aligned with shaft 218. This provides two relatively movable shafts rotatable about a common axis and the shafts are supported in the bearings 224 and 225 carried in the side plate 204 and bracket 208, respectively, with their intermediate support being provided by the connection 221 and 222.

In order to transmit the drive from the shaft 218 to the shaft 223, a lost motion connection is provided which includes a first disc 228 (see also Figs. 10-12) keyed to the shaft 218 and which pivotally supports the dog 229, and a disc 230 that is secured to the shaft 223 and the latter supports a pin 231 in the path of the dog 229 of the disc 228. The dog 229 is normally maintained in fixed relation to the disc 228 and also with respect to the pin 231 by means of the spring 233 which is connected between the ear 234 of the dog 229 and the pin 235 secured to the side of the disc 228. It is to be noted that the ear 234 is made to project at right angles to the face of the dog 229 so as to engage the surface 236 of the disc 228 thereby maintaining the hook portion 237 of said dog in proper spaced relation from the axial center of the shaft 218 for the purpose of hooking onto the pin 231 as the disc 228 is relatively rotated with respect to the disc 230.

The shaft 223 projects into the housing 209 and a rotational limit control latch 240 (see Fig. 7) is secured to the shaft 223 within the housing 209. The latch wheel 240 is provided with the notch 241 which is adapted to receive the end 242 of the lock arm 243. The lock arm 243 is pivotally supported at 244 on the side plate 208 of the bracket 201 and the spring 245 is adapted to normally urge the lock arm 243 in a direction to maintain the stop lug 242 in the notch 241 of the latch wheel 240. The lock arm is provided with a spring-pressed dog 246 pivotally supported at 247 on the lock arm 243 and the spring 248 normally holds the dog 246 against the ear 249 which is part of the lock arm 243 and which is bent at right angles to the face thereof. With this particular construction, the dog 246 provides a driving means for rotating the lock arm 243 whenever the actuating arm 212 is rotated by means of the hand wheel 211, since the dog 246 and actuating arm 212 are disposed in vertical alignment with the dog in the path of the actuating arm.

The drive to the film sprocket 250 is completed by means of the shiftable gear train designated generally by 251 and which is enclosed within the housing 209. A gear unit comprising the bearing member 252 is provided with a slot 253 engageable by the pin 254 secured to the end of the shaft 223. The bearing member 252 journals on the end of the shaft 223 and has a stub shaft portion 255 connected therewith for supporting the gears 256 and 257 for rotation therewith. The outer end of the stub shaft 255 is provided with spaced grooves 258 and 259 to each releasably engage spring-pressed ball 260 in the manner best illustrated in Fig. 8. The outer end of the stub shaft 255 projects through the housing 209 and the hand knob 261 is secured to the projecting end of the shaft. By moving the stub shaft 255 by means of the knob 261 from the groove position 259 to the position 258, the gears 256 and 257 are shifted as a unit to engage the gears 262 and 263 by selection depending upon whether the knob 261 is moved inwardly or outwardly relative to the housing 209.

The other gears 262 and 263 are riveted to the flange 264 of the supporting member 265 and the latter is keyed to the shaft 266, which traverses the housing 209 and the bracket 201 and side plate 204. The drive from the shaft 266 is transmitted to the film sprocket 250 through releasable clutch means 267.

The clutch 267 and clutch actuating mechanism forms no part of the present subject matter and for a full understanding of the same references may be had to my prior application above referred to.

Operation of the film transport mechanism

Referring now more particularly to Figs. 10 to 12, inclusive, the operation of the film transport mechanism may best be described as follows: The rotation of the actuator arm 212 will cause the arm to strike the end of the dog 246 which in turn will rock the lock arm 243 about its pivot 244 to move the latch lug 242 of the arm out of the notch 241 of the latch wheel 240, During this movement, the segment gear 219 will revolve the pinion 220, but as best shown in Fig. 10, the dog 229 by its position relative to the pin 231 when turned in clockwise direction has sufficient movement prior to the engagement of the pin 231 to allow the free movement of the parts hereinbefore referred to. As the actuator arm 212 continues its motion and as best seen in Fig. 11, the lock arm is now moved out of engagement with the notch 241 and continued motion of the shaft 210 and its actuator arm 212 will now cause the dog 229 to have its hooked end 237 engage the pin 231. Obviously, as the dog 229 engages the pin 231, shafts 218 and 223 (see Fig. 8) will now rotate as a unit to drive the gear group comprising the gears 256 and 257 through the instrumentality of the pin 254 and the slot 253, the latter also being best illustrated in Fig. 8. Continued rotation of the shaft 210 by the knob 211 will now cause the actuator arm 212 to pass beyond the end of the dog 246 releasing the lock arm 243 and the latter through the action of the spring 245 will then be rotated in a clockwise direction to cause the lug 242 of the arm to engage against the outer peripheral surface of the latch wheel 240. At this state, the arm 243 and its associated mechanisms will be held against rotation and in the fixed position shown in Fig. 12, while continued rotation of the shaft 210 now additionally drives the gears 256 and 257 through the segmental gear 219 and pinion 220 and the connected shafts 218 and 223.

Rotation of the shafts 218 and 223 as a unit is then continued until the notch 241, best shown in Fig. 12, will again receive the lug 242 of the arm 243. To insure positive engagement of the lug 242 within the slot 241, the peripheral surface of the latch wheel 240 is flattened substantially as shown at 300 to drop the lug 242 radially into the path of the wall of the notch 241 oppositely disposed with respect to the surface 300. It is therefore seen that each movement of the hand wheel 211 through the mechanism described will cause one complete revolution of the shafts 218 and 223 as determined by the notch 241 on the latch wheel 240, and its relation to the lug 242 on the lock arm 243.

Also, the reverse motion of the disc 228 carrying the dog 229 is greater than one revolution in view of the fact that the dog as best shown in Fig. 10 must first advance to engage the pin 231 and thereafter rotate the pin through 360 degrees. It is for this reason that the dog 229 is resiliently maintained against the face 236 of the disc 228 by means of the spring 233 inasmuch as the reverse motion of the disc 228 will then allow the surface 300a contiguous with the hook portion 237 of the dog to engage and snap past the pin 231 during the reversal of movement of the shaft 218 carrying the disc 228. Obviously, the disc 228 and its dog 229 will then be returned to the position illustrated in Fig. 10, after the pinion 220 and its driving gear segment 219 are returned to the position initially shown in Fig. 10, wherein the actuator arm 212 will abut the stop 213 which is the initial and inoperative position of the film transport mechanism.

The gear mechanism indicated generally at 251 in Fig. 8 has been devised for the purpose of providing means for advancing the film either three frames at a time or by means of a single frame whenever black and white individual frame picture projection is desired. It is for this purpose that the shifting device as best illustrated in Fig. 8 has been incorporated. The drive as now shown with the knob 261 moved adjacent the housing 209 will provide the necessary rotation through the gears 256 and 262 for rotating the sprocket 250 an amount whereby the lineal movement of the film will bodily advance successive groups of three frames of each photographed object for the purpose of color projection.

Whenever the knob 261 is moved outwardly and away from the housing 209 into its other position, the drive from shaft 223 through the pin 254 and notch 253 will now be transmitted through the pinion 257 and gear 263 providing a different gear ratio whereby the drive to shaft 266 will advance the film sprocket 250 to the extent whereby the film will be advanced a single frame at a time whenever black and white single frame projection is desired.

With the transport mechanism just described it is possible by means of the reductions imposed through the various gears to obtain a high speed film advance which will be great enough so as to be substantially imperceptible to the eye without causing annoyance to the observers during screen projection. It is to be noted that the film advance is controlled by approximately a quarter turn of the knob 211 making it simple for an operator to obtain the high speed through the transport gear mechanism. It is for this reason that the present projector has made possible the elimination of shutter mechanism, adding to the simplicity of the entire projector with a corresponding saving in the cost of production by eliminating such additional mechanism.

Since each picture transposition requires only about a 90 degree turn of the knob 211 and the latter is automatically returned to its initial position each time by the coil spring 214, only a slight movement of the hand efficiently changes the projected pictures.

*Pressure plate release mechanism*

It is desirable to release all pressure on the film during the advance thereof by means of the film transport mechanism and this is accomplished through the agency of the arm 80 rockably carried on the shaft 70 which provides the instrumentality for retracting the pressure plate 41 to allow free passage of the film during transposition between the pressure plate 41 and the fixed backing plate 42, in the manner that was hereinbefore fully described.

Movement of shaft 70 by means of the arm 80 is accomplished by means of the contact ear member 80a which is turned at right angles to the face of the arm 80 and which operates within the housing 209 to normally bear against the outer surface 80b of the lock arm 243. The ear 80a is normally maintained against the surface of the end of the lock arm 243 through the action of the resilient means associated with the pressure plate mechanism.

Referring now to Fig. 10, it is seen that the initial movement of the actuator arm 212 for rocking the lock arm 243 will cause the end 80a of the arm 80 to rise from the surface 80b to the surface 80c which is concentric with respect to the pivot 244 of arm 243 prior to any film motion, inasmuch as the dog 229 has not yet engaged the pin 231, and obviously as the ear 80a rides upon the surface 80c, shaft 70 will be rocked in the proper direction by means of the arm 80 to move the pressure plate 41 away from its film positioning relation against the backing plate 42. With this mechanism in combination with the film transport means, a positive release of the film is first effected prior to any lineal movement thereof which is the ideal situation.

The foregoing completes the description of the new and novel features combined and contained substantially as shown in the drawings and as embodied in the projector of the present invention. No particular reference has been made to the manner and means in which some of the members of the condenser system, etc., are supported nor in the manner in which the lamp is connected to the housing inasmuch as these constructions are well known to those skilled in the art. Likewise the projector is provided with suitable light shielding diaphragms, and such dividers or light shields are usually supplied for the prevention of light diffusion between the respective triple projection members utilized in color photograph projection or the like.

The foregoing description relating to the preferred embodiment of the present projector as disclosed in the drawings may obviously permit various modifications in the preferred construction that presumably will not depart from the general scope and field of the present invention. Hence, it is to be understood that the present projector is not to be limited to the exact form, construction, arrangement or combination of parts as specifically referred to and described, or for the particular uses mentioned, excepting insofar as shall be governed by the appended claims.

What I claim as new and desire to secure by Letters Patent is:

1. A film transport mechanism for intermittently advancing the film through a releasable pressure plate unit adapted for holding said film in a predetermined focal plane, comprising a main drive shaft, a pair of coaxially aligned countershafts, and a film driving sprocket to advance the film for changing the picture images, actuating means connected between said drive shaft and one of the countershifts to positively revolve the latter, a one way clutch unit for connecting said countershafts, said clutch being adapted to operatively join said countershafts after a predetermined interval of movement of said main drive shaft, sprocket driving means connected between the other of said countershafts and the film sprocket to advance the film during the effective operation of said one way clutch, and release means adapted to be driven by said main drive shaft during the interval of movement of said shaft prior to the joining of said countershafts for operatively releasing the pressure plate unit and the film therebetween before said film is advanced by said film sprocket.

2. In a projector, the combination of film transport mechanism for intermittently advancing a film through the pressure plate mechanism of film guiding and aligning means, said transport mechanism comprising a drive shaft, a pair of coaxially aligned countershafts, and film sprocket mechanism to intermittently advance the film images, actuating means connected between said drive shaft and one of said countershafts to revolve the latter, a one way clutch mechanism for connecting said countershafts at a predetermined interval during the actuation of said drive shaft, and sprocket driving means connected between the other of said countershafts and said sprocket mechanism to advance the film during the effective operation of said one way clutch, said pressure plate mechanism including release means connected with said transport mechanism for releasing the pressure plate mechanism from the film during the advance of said film, said transport mechanism having operative means whereby said release of the pressure plate mechanism is accomplished before the operation of said clutch mechanism and prior to the movement of said film, and whereby said release means maintains said pressure plate mechanism in inoperative position until said transport mechanism completes the film advance.

3. In a projector, the combination of a stationary apertured plate and a retractible spring-pressed apertured pressure plate between which plates a film strip is held in a predetermined focal plane, film transport mechanism including a drive shaft, a first driven shaft driven from said drive shaft, a second driven shaft in coaxial alignment with said first driven shaft, and a lost motion clutch connection between said driven shafts, a film advancing sprocket and operative connection between said second named driven shaft and sprocket, means for retracting said pressure plate, means actuated by said drive shaft during the interval of lost motion of said lost motion connection, to actuate said pressure plate retracting means, whereby to release the pressure on the film during the entire movement of the film advancing sprocket.

4. In a projector, the combination of a lamp casing and a lens housing, lenses in said lens housing, a stationary apertured plate carried by said lens housing and a retractible spring-pressed apertured pressure plate between which plates a film strip is held in a predetermined focal plane, film transport mechanism including an oscillatory drive shaft, a first driven shaft driven from said drive shaft, a second driven shaft in coaxial alignment with said first driven shaft and a lost motion clutch connection between said driven shafts, a film advancing sprocket and operative connections between said second named driven shaft and sprocket, means for retracting said pressure plate, means actuated by said drive shaft during the interval of lost motion of said lost motion clutch connection to actuate said pressure plate retracting means, whereby to release the pressure on the film strip during the entire movement of the film advancing sprocket.

5. In a projector, the combination of a lamp casing and a lens housing, lenses in said lens housing, a stationary apertured plate carried by said lens housing and a retractible spring-pressed apertured pressure plate, between which plates a film spring is held in a predetermined focal plane, film transport mechanism including an oscillatory drive shaft, a first driven shaft driven therefrom and a second driven shaft in coaxial alignment with said first driven shaft, a lost motion clutch connection between said two driven shafts for coupling them to rotate as a unit during a portion of the cycle of movement of the drive shaft, and a film advancing sprocket, operative drive connection between said second named driven shaft and sprocket, pressure plate retracting mechanism and means actuated by said drive shaft to actuate said plate retracting mechanism during the interval of lost motion of said lost motion clutch connection, whereby pressure on the film strip is released during the entire movement of the second named driven shaft and film advancing sprocket.

6. In a projector, the combination of a lamp casing and a lamp housing, lenses in said lens housing, a stationary apertured plate carried by the lens housing and a retractible spring-pressed apertured pressure plate, between which plates a film strip is held in a predetermined focal plane, film transport mechanism including an oscillatory drive shaft, a first driven shaft, a gear segment mounted upon said drive shaft, a pinion mounted on said first driven shaft and meshing with said gear segment, a second driven shaft in coaxial alignment with said first driven shaft, a lost motion clutch connection between said two driven shafts for coupling them to rotate as a unit during a portion of the cycle of movement of the drive shaft, and a film advancing sprocket, operative drive connections between said second named driven shaft and sprocket, pressure plate retracting mechanism and means actuated by said drive shaft to actuate said plate retracting mechanism during the interval of lost motion of said lost motion clutch connection, whereby pressure on the film strip is released during the entire movement of the second named drive shaft and film advancing sprocket.

7. In a projector, the combination of a lamp casing and a lens housing, lenses in said lens housing, a stationary apertured plate carried by said lens housing, and a retractible spring-pressed apertured pressure plate, between which plates a film strip is held in a predetermined focal plane, film transport mechanism including an oscillatory drive shaft, a first driven shaft driven therefrom, a second driven shaft, a lost motion connection between said two driven shafts for coupling them to rotate as a unit during a portion of the cycle of movement of the drive shaft, a film advancing sprocket, and operative drive connection between said second named driven shaft and sprocket, an oscillatory pressure plate actuating lever, a rockable lock arm arranged to engage said lever to shift it to pressure plate releasing position, and an actuating arm carried by said drive shaft for shifting said lock arm into film release position during the lost motion period of said lost motion connection.

8. In a projector, the combination of a lamp casing and a lamp housing, lenses in said housing, a stationary apertured plate carried by the lens housing and a retractible spring-pressed apertured pressure plate, between which plates a film strip is held in a predetermined focal plane, film transport mechanism including an oscillatory drive shaft, a first driven shaft driven therefrom and a second driven shaft, a lost motion connection between said two driven shafts for coupling them to rotate as a unit during a portion of the cycle of movement of the drive shaft, said lost motion connection comprising a dog carried by one driven shaft and a pin carried by the said second named driven shaft and arranged to be engaged by said dog, said dog having an interval of lost motion in its cycle of operation, a film advancing sprocket, operative drive connection between said second named driven shaft and sprocket, pressure plate retracting mechanism and means actuated by said drive shaft to actuate said plate retracting mechanism to thereby release pressure on the film strip during the interval of lost motion of said lost motion connection, whereby pressure on the film is released during the entire movement of the film advancing sprocket.

9. In a projector, the combination of a lamp casing and a lens housing, lenses therein, a stationary apertured plate carried by the lens housing and a retractible spring pressed pressure plate cooperating with the stationary plate to hold a film strip therebetween in a fixed focal plane, film transport mechanism including an oscillatory drive shaft, a gear segment thereon, a first driven shaft, a pinion thereon meshing with said gear segment, a second driven shaft, a delayed action clutch for coupling said driven shafts to rotate in unison during a portion of the cycle of rotation of the first named driven shaft, a film advancing sprocket and drive connection between said second named driven shaft and sprocket, pressure plate retracting means comprising an actuating arm on the drive shaft, a lock arm actuated thereby during the initial movement of the drive shaft, and a lever having one end connected to the pressure plate and the other end arranged to be engaged and moved by said actuating arm in a direction to retract the pressure plate prior to the clutching operation of the delayed action clutch whereby the entire advance of the film strip occurs subsequent to the release of the film strip.

10. In a projector, the combination of a lamp casing and a lens housing, lenses therein, a stationary apertured plate carried by the lens housing and a retractible spring-pressed pressure plate, cooperating with the stationary plate to hold a film strip therebetween in a fixed focal plane, film transport mechanism including an oscillatory drive shaft, a gear segment thereon, a first driven shaft, a pinion thereon meshing with said gear segment, a second driven shaft, a delayed action clutch between said driven shafts comprising discs, one mounted on each shaft, a dog pivotally mounted on one disc and a coacting pin mounted on the other disc and extending into the path of movement of the dog, the dog and pin being circumferentially spaced apart when the shafts are stationary, whereby the first driven shaft is capable of partial rotation relative to the second named driven shaft, a film advancing sprocket and drive connection between said second named driven shaft and sprocket, pressure plate retracting means comprising an actuating arm on the drive shaft, a lock arm actuated thereby during the initial movement of the drive shaft, and a lever having one end connected to the pressure plate and the other end arranged to be moved by said actuating arm in a direction to retract the pressure plate prior to the clutching operation of the delayed action clutch, whereby the entire advance of the film strip occurs subsequent to the release of the film strip.

11. In a projector, the combination of a lamp casing and a lens housing, lenses therein, a stationary apertured plate carried by the lens housing, and a retractible spring-pressed pressure plate carried by the lamp casing and cooperating with the stationary plate to hold a film strip therebetween, film transport mechanism including an oscillatory drive shaft, a gear segment thereon, a first driven shaft, a pinion thereon meshing with said gear segment, a second driven shaft, a delayed action clutch for coupling said driven shafts to rotate in unison during a portion of the cycle of rotation of the first named driven shaft, a film advancing sprocket, and drive connections between said second named driven shaft and sprocket, pressure plate retraction means comprising an actuating arm on the drive shaft, a lock arm actuated thereby during the initial movement of the drive shaft and having a locking connection with the second named driven shaft when the driven shafts are stationary, said lock arm having also lever actuating means, a lever having one end connected with the pressure plate and its other end lying in the path of movement of said lever actuating means of the lock arm and adapted to be shifted thereby in a direction to retract the pressure plate prior to the time the clutching action takes place between the two driven shafts, whereby the film strip is released prior to the advancement thereof by the sprocket.

12. In a projector, the combination of a lamp casing and a lens housing, lenses therein, a stationary apertured plate carried by the lens housing, and a retractible spring-pressed pressure plate carried by the lamp casing and adapted to cooperate with the stationary plate to hold a film strip therebetween, film transport mechanism including a drive shaft, a film advancing sprocket and driving connections between said drive shaft and sprocket, said drive connections having a delayed action clutch therein whereby the drive shaft may be partially rotated without driving the sprocket, and a pressure plate retracting lever having one end connected with the pressure plate and its other end arranged to be actuated from said drive shaft, prior to the time it rotates the sprocket, whereby pressure on the film strip is released prior to the movement of the sprocket.

WILLIAM A. LEBUS.